(12) United States Patent
Bomhoff et al.

(10) Patent No.: US 7,818,612 B2
(45) Date of Patent: *Oct. 19, 2010

(54) APPARATUS, SYSTEM, AND METHOD FOR PERFORMING STORAGE DEVICE MAINTENANCE

(75) Inventors: Matthew David Bomhoff, Tucson, AZ (US); Brian James Cagno, Tucson, AZ (US); Gregg Steven Lucas, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/140,030

(22) Filed: Jun. 16, 2008

(65) Prior Publication Data

US 2008/0244101 A1 Oct. 2, 2008

Related U.S. Application Data

(63) Continuation of application No. 11/045,163, filed on Jan. 28, 2005, now Pat. No. 7,401,260.

(51) Int. Cl.
*G06F 11/00* (2006.01)

(52) U.S. Cl. ............... 714/8; 714/4; 714/5; 714/11; 714/25; 714/31; 714/42

(58) Field of Classification Search ............ 714/4, 714/5, 811, 25, 31, 42
See application file for complete search history.

(56) References Cited

U.S. PATENT DOCUMENTS

| | | | |
|---|---|---|---|
| 5,155,845 A | 10/1992 | Beal et al. | |
| 5,893,138 A | 4/1999 | Judd et al. | |
| 6,148,414 A | 11/2000 | Brown et al. | |
| 6,151,641 A | 11/2000 | Herbert | |
| 6,219,753 B1 | 4/2001 | Richardson | |
| 6,560,673 B2 | 5/2003 | Elliott | |
| 6,701,449 B1 | 3/2004 | Davis et al. | |
| 6,725,294 B1 | 4/2004 | Moore et al. | |
| 7,080,202 B2 | 7/2006 | Kasako et al. | |
| 7,231,465 B2 | 6/2007 | Innan et al. | |
| 7,266,665 B2 | 9/2007 | Stanley et al. | |
| 2002/0161848 A1 | 10/2002 | Willman et al. | |
| 2002/0169996 A1 | 11/2002 | King et al. | |
| 2004/0024964 A1 | 2/2004 | Taninaka et al. | |
| 2004/0073677 A1 | 4/2004 | Honma et al. | |
| 2006/0107098 A1 | 5/2006 | Maki et al. | |
| 2006/0143543 A1 | 6/2006 | Mandrell et al. | |

*Primary Examiner*—Robert Beausoliel
*Assistant Examiner*—Charles Ehne
(74) *Attorney, Agent, or Firm*—Kunzler Needham Massey & Thorpe

(57) ABSTRACT

An apparatus and system are disclosed for performing a storage device maintenance operation. A management module receives a command through an interconnection module configured as a non-blocking switch. The management module performs a maintenance operation on a storage device through the interconnection module in response to the command. In addition, the management module may receive queries on the status of the maintenance operation through the interconnection module and report the status of the maintenance operation through the interconnection module.

24 Claims, 6 Drawing Sheets

APPARATUS, SYSTEM, AND METHOD FOR PERFORMING STORAGE DEVICE MAINTENANCE

CROSS-REFERENCE TO RELATED APPLICATIONS

This application is a continuation of U.S. patent application Ser. No. 11/045,163 filed on Jan. 28, 2005 now U.S. Pat. No. 7,401,260, entitled APPARATUS, SYSTEM, AND METHOD for PERFORMING STORAGE DEVICE MAINTENANCE, and claims all rights of priority and incorporation available due to this continuation relationship

FIELD

This invention relates to performing storage device maintenance operations and more particularly relates to a local management module performing maintenance operations.

DESCRIPTION OF THE RELATED ART

A computer storage system typically includes a plurality of storage devices such as hard disk drives, magnetic tape drives, optical storage drives, and the like. Each storage device is usually in communication through a communication channel with a control device wherein referred to as an adapter module. The adapter module communicates with one or more host systems. In addition, the adapter module controls and arbitrates access by a host system to a storage device.

For example, the host system may communicate a request to retrieve data from the storage device to the adapter module. The adapter module may then direct the storage device to communicate the desired data to the adapter module, and the adapter module communicates the data to host system. Similarly, the host system may communicate data to the adapter module for storage on the storage device. The adapter module directs the storage device to receive the data and store the data in a specified location.

The adapter module typically also performs maintenance operations on the storage device. For example, the adapter module may perform a health check maintenance operation on the storage device to verify that the storage device is functioning normally. Alternatively, the adapter module may perform an initialization operation on the storage device such as when the storage device is added to an array of storage devices.

The adapter module typically controls a plurality of storage devices. For example, the adapter module may control a plurality of hard disk drives comprising a redundant array of independent drives ("RAID"). While controlling the plurality of storage devices, the adapter module may simultaneously access one or more storage devices for a host system and perform maintenance operations on one or more storage devices. Unfortunately, the adapter module may lack the processing bandwidth to both access and control the storage devices and to perform maintenance operations. In addition, it may be desirable to further improve the communication channel's performance during maintenance operations.

From the foregoing discussion, it should be apparent that a need exists for an apparatus, system, and method that locally performs a storage device maintenance operation. Beneficially, such an apparatus, system, and method would increase access to storage device data while the maintenance operation is performed.

SUMMARY OF THE INVENTION

The present invention has been developed in response to the present state of the art, and in particular, in response to the problems and needs in the art that have not yet been fully solved by currently available maintenance methods. Accordingly, the present invention has been developed to provide an apparatus, system, and method for performing a maintenance operation that overcome many or all of the above-discussed shortcomings in the art.

The apparatus to perform a maintenance operation is provided with a logic unit containing a plurality of modules configured to functionally execute the necessary steps of receiving a command through an interconnection module and performing the maintenance operation through the interconnection module. These modules in the described embodiments include an interconnection module and a management module.

The interconnection module is configured as a non-blocking switch. As used herein, the non-blocking switch is configured such that any communication through the switch does not interfere with any other communication through the switch. The interconnection module communicates with a storage device and an adapter module. The adapter module controls the storage device through the interconnection module, storing data to and retrieving data from the storage device through the interconnection module.

The management module also communicates with the interconnection module. In addition, the management module receives a command through the interconnection module from the adapter module directing the management module to perform a maintenance operation on the storage device. The management module performs the maintenance operation on the storage device through the interconnection module in response to the command. The apparatus performs the maintenance operation locally freeing communications bandwidth and adapter module processing bandwidth.

A system of the present invention is also presented to perform a maintenance operation. The system may be embodied in a storage system. In particular, the system, in one embodiment, includes an adapter module and a first enclosure module comprising a storage device, a first interconnection module, and a management module.

The adapter module controls the storage device and the management module of the enclosure through the first interconnection module. The adapter module may further control a plurality of enclosures. In one embodiment, the interconnection module of each enclosure is in communication with at least one other interconnection module. The adapter module may communicate with the first interconnection module of the first enclosure, and through the first interconnection module communicate with a second interconnection module of a second enclosure.

The interconnection module is configured as a non-blocking switch. The management module receives a command through the interconnection module from the adapter module directing the management module to perform a maintenance operation on the storage device. The management module performs the maintenance operation on the storage device through the interconnection module in response to the command.

A method of the present invention is also presented for performing a maintenance operation. The method in the disclosed embodiments substantially includes the steps necessary to carry out the functions presented above with respect to the operation of the described apparatus and system. In one embodiment, the method includes receiving a command through an interconnection module and performing the maintenance operation through the interconnection module.

A management module receives a command through an interconnection module configured as a non-blocking switch. The management module performs a maintenance operation on a storage device through the interconnection module in response to the command. In one embodiment, the management module further receives a query of the status of the maintenance operation through the interconnection module. The management module may also report the status of the maintenance operation through the interconnection module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention performs a maintenance operation locally through a non-blocking interconnection module on a storage device in response to a command received through the interconnection module. In addition, the present invention may free communications bandwidth through the interconnection module and the processing bandwidth of an adapter module in communication with the interconnection module. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
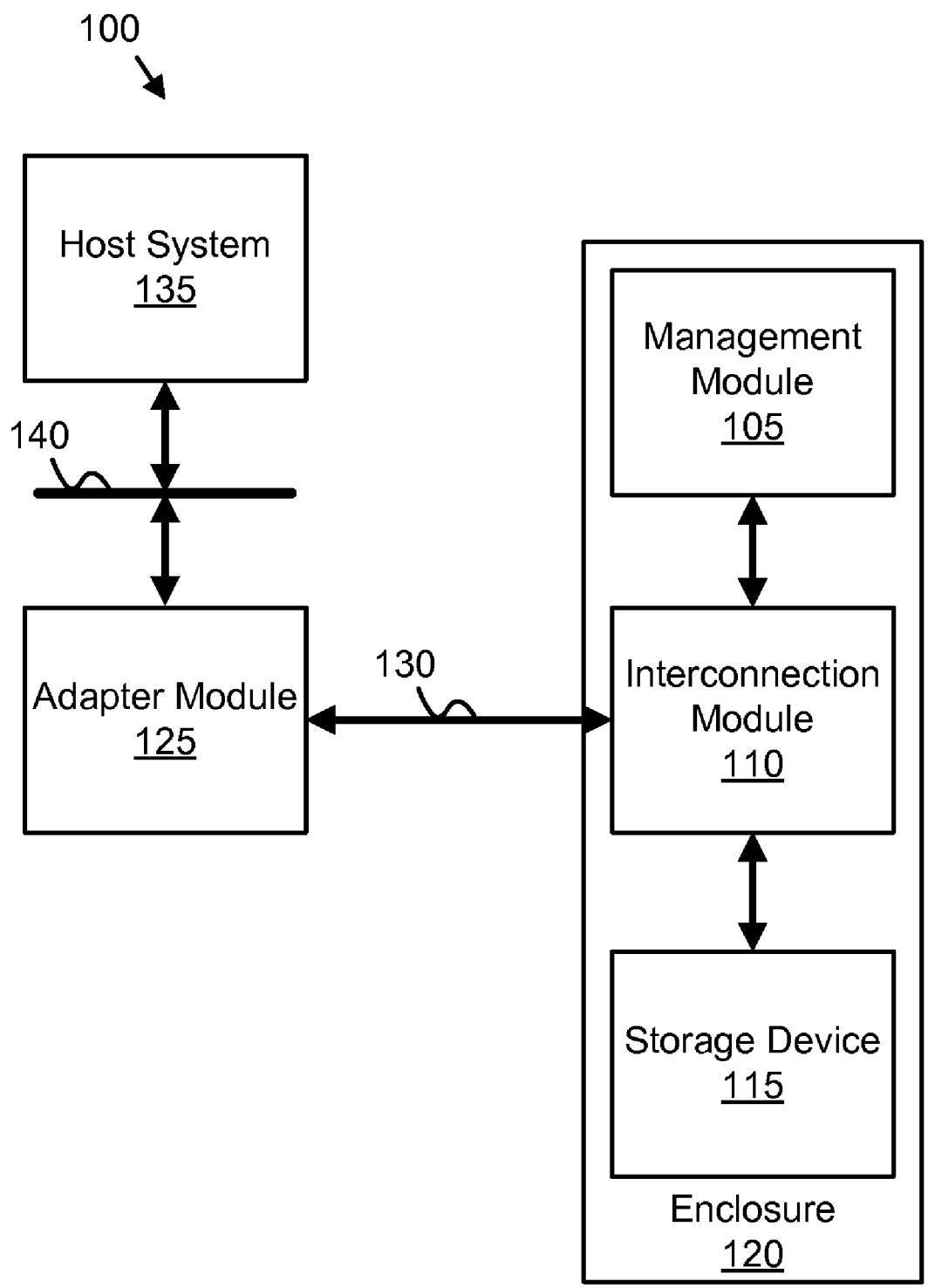
FIG. 1 is a schematic block diagram illustrating one embodiment of a maintenance system in accordance with the present invention.

FIG. 1 is a schematic block diagram illustrating one embodiment of a maintenance system 100 of the present invention. The system 100 includes an adapter module 125 and an enclosure 120. The enclosure 120 further includes a management module 105, an interconnection module 110, and a storage device 115.

The adapter module 125 controls the storage device 115 and the management module 105 of the enclosure 120 through the interconnection module 110. For example, the adapter module 125 may store data to and retrieve data from the storage device 115. The adapter module 125 communicates with the interconnection module 110 through a communication channel 130. In one embodiment, the communication channel 130 is a Fibre Channel Arbitrated Loop such as defined by the American National Standards Institute of Washington D.C.

In one embodiment, the adapter module 125 is in communication with a host system 135. The adapter module 125 and the host system 135 may communicate through a network 140. The adapter module 125 may receive requests to access the storage device 115 from the host system 135. For example, the host system 135 may request the adapter module 125 to retrieve data from a specified location of the storage device 115. The adapter module 125 directs the storage device 115 to retrieve the desired data and communicate the desired data to the host system 135.

In the past, the adapter module 125 has also performed a maintenance operation on the storage device 115. Unfortunately, the performance of the maintenance operation on the storage device 115 by the adapter module 125 reduces the processing bandwidth of the adapter module 125 and the communication bandwidth of the communication channel 130. The present invention performs the maintenance operation locally within the enclosure 120 to reduce the processing demands on the adapter module 125 and the communication demands on the communication channel 130.

The interconnection module 110 is configured as a non-blocking switch. As used herein, a non-blocking switch is configured such that any communication through the switch does not interfere with any other communication through the switch. In one embodiment, the interconnection module 110 is configured as a non-blocking Fibre Channel Arbitrated Loop switch.

The adapter module 125 sends a command to the management module 105 through the interconnection module 110. The command directs the management module 105 to perform the maintenance operation on the storage device 105. The management module 105 performs the maintenance operation on the storage device 115 through the interconnection module 110 in response to the command. The adapter module 125 is freed from performing the maintenance operation. In addition, the communication channel 130 is freed from the bandwidth requirements of the adapter module 125 performing the maintenance operation through the communication channel 130.

Figure 2:
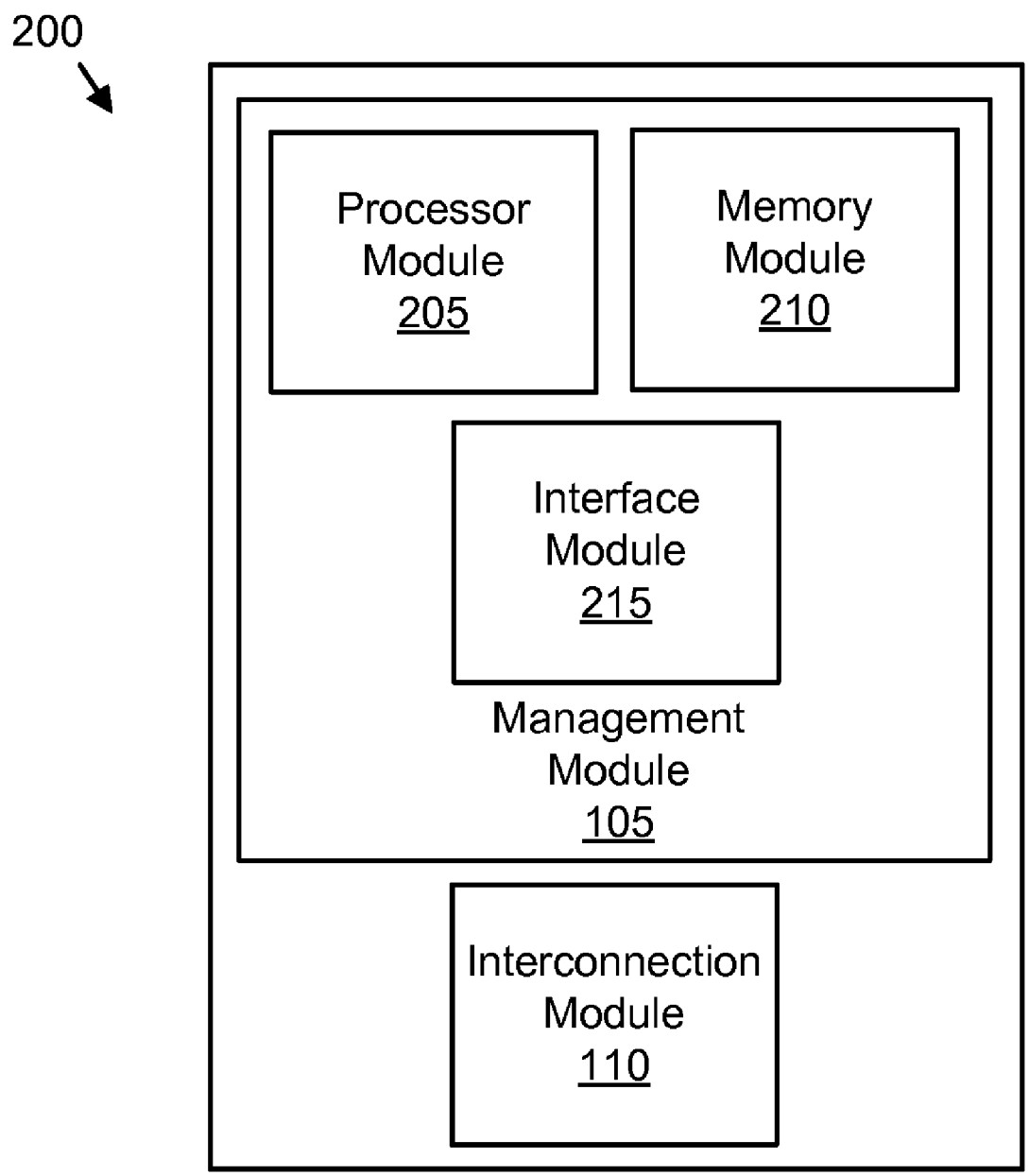
FIG. 2 is a schematic block diagram illustrating one embodiment of a maintenance apparatus of the present invention.

FIG. 2 is a schematic block diagram illustrating one embodiment of a maintenance apparatus 200 of the present invention. The apparatus 200 includes an interconnection module 110 and a management module 105 comprising a processor module 205, a memory module 210, and an interface module 215. Although the apparatus 200 is depicted with one management module 105 and one interconnection module 110, any number of management modules 105 and interconnection modules 110 may be employed.

The interconnection module 110 communicates with a plurality of devices and communication channels 130 including the management module 105. In addition, the interconnection module 110 comprises a port for each device and communication channel 130. The interconnection module 110 is further configured as non-blocking switch. For example, the interconnection module 110 may include a plurality of internal communication channels sufficient to connect each port with each other port. The interconnection module 110 may perform a plurality of communication operations involving the plurality of devices and communication channels 130.

The memory module 210 stores one or more software programs and data. The processor module 205 executes the software programs and processes the data as is well known to those skilled in the art. The processor module 205 communicates with the interconnection module 110 through the interface module 215. In one embodiment, the processor module 205 receives a command from an adapter module 125 through the interconnection module 110 and the interface module 215. The processor module 205 may decode the command as a directive to perform a specified maintenance operation. The specified maintenance operation may comprise one or more software programs and one or more data words.

The processor module 205 retrieves and executes the software instructions of the specified maintenance operation's software programs and processes the specified maintenance operation's data. Responsive to the software programs and data, the processor module 205 may communicate commands and data through the interface module 215 and the interconnection module 110 to a storage device 115. The communicated commands and data may direct the storage device 115 to perform actions conforming to the specified maintenance operation.

For example, responsive to the software programs and data of the maintenance operation, the processor module 205 may direct the storage device to write a binary pattern such as all binary zeros (0) to one or more physical locations of the storage device's 115 storage media as part of a surface initialization maintenance operation. The communication between the management module 105 and the storage device 115 does not interfere with any other communications through the interconnection module 110 because of the non-blocking nature of the interconnection module 110. The apparatus 200 performs the maintenance operation without degrading the performance of other communication operations of the interconnection module 110.

Figure 3:
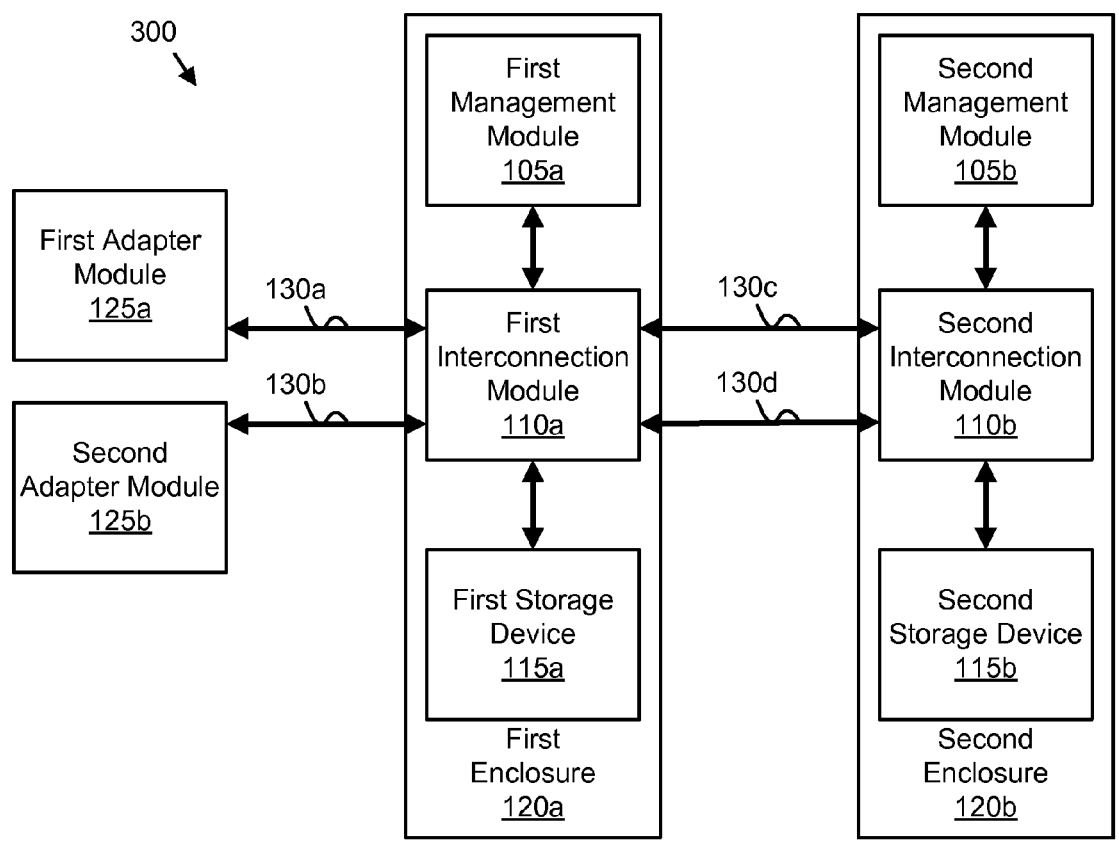
FIG. 3 is a schematic block diagram illustrating one embodiment of a multiple enclosure maintenance system of the present invention.

FIG. 3 is a schematic block diagram illustrating one embodiment of a multiple enclosure maintenance system 300 of the present invention. The system 300 includes one or more adapter modules 125, one or more communication channels 130, and one or more enclosures 120 each comprising a management module 105, an interconnection module 110, and a storage device 115. Although the depicted system 300 includes two adapter modules 125 and two enclosures 120, any number of adapter modules 125 and enclosures 120 may be employed.

The first and second adapter modules 125a, 125b communicate with the first interconnection module 110a through the first and second communication channels 130a, 130b respectively. The first interconnection module 110 of the first enclosure 120a is in communication with the second interconnection module 110b of the second enclosure 120b through the third and fourth communication channels 130c, 130d. The adapter modules 125 communicate through the first interconnection module 110a with the second interconnection module 110b. For example, the first adapter module 125a may store data to the first storage device 115a through the first interconnection module 110a while the second adapter module 125b retrieves data from the second storage device 115b through the second interconnection module 110b and the first interconnection module 110a.

An adapter module 125 may communicate a command to execute a maintenance operation to a management module

105. For example, the first adapter module 125*a* may communicate a command to execute a health check maintenance operation to the first management module 105*a* through the second communication channel 130*b* and the first interconnection module 110*a*. The first management module 105*a* performs the health check maintenance operation on the first storage device 115*a* through the first interconnection module 110*a*.

Because the interconnection modules 110 are configured as non-blocking switches, the first management module 105*a* may perform the maintenance operation on the first storage device 115*a* without interfering with communications through the first interconnection module 110*b* such as between the first and second adapter modules 125*a*, 125*b* and the second interconnection module 110*b*. For example, the second adapter module 125*b* may retrieve data from the second storage device 115*b* through the second interconnection module 110*b* and the first interconnection module 110*a* without interfering with the health check maintenance operation performed by the first maintenance module 105*a*.

In addition, the health check maintenance operation of the first management module 105*a* does not require the processing bandwidth of the first and second adapter modules 125*a*, 125*b*, nor require the bandwidth of the communication channels 130. The system 300 locally performs maintenance operations on a storage device 115 to reduce demands on other elements of the system 300.

Figure 4:
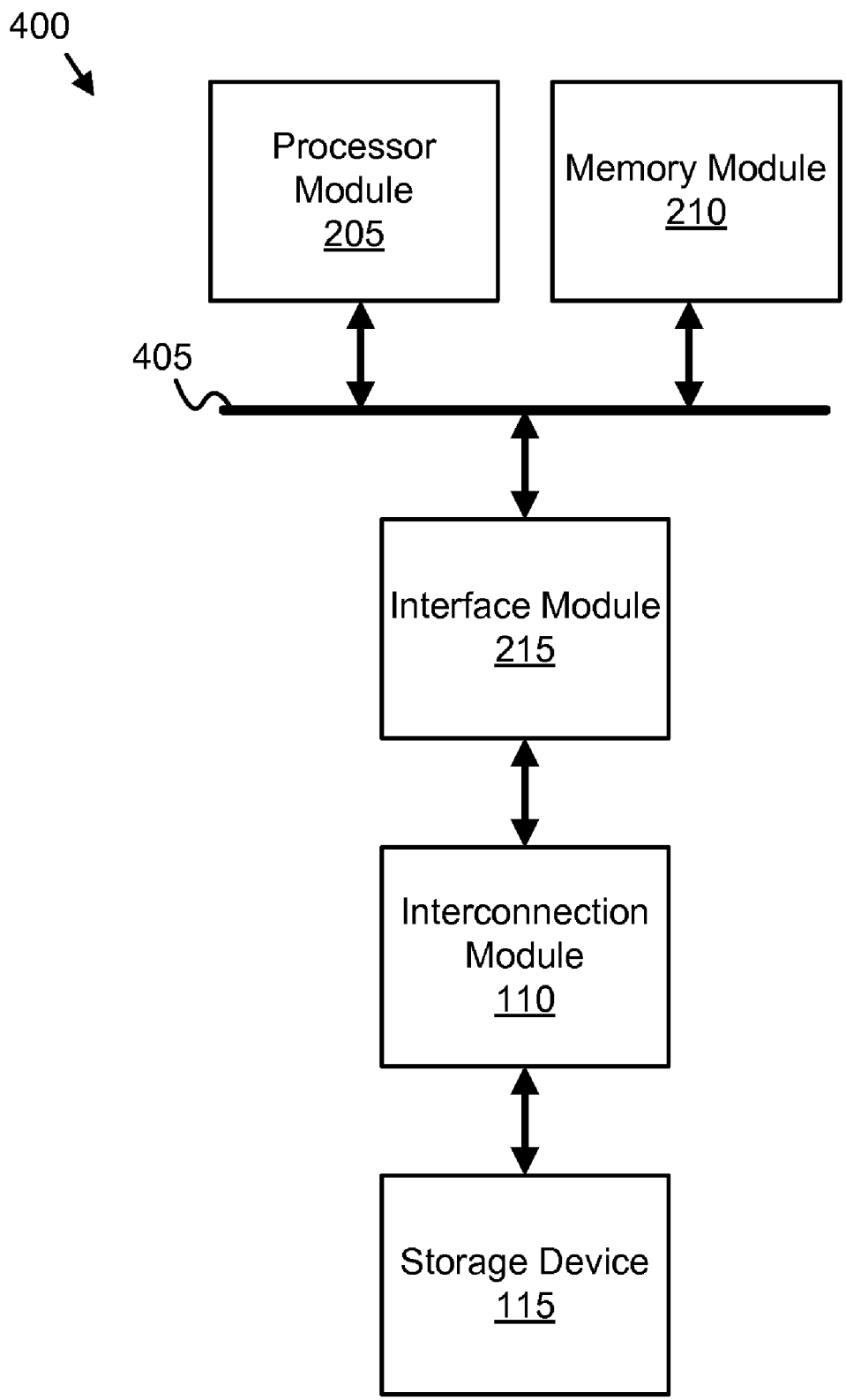
FIG. 4 is a schematic block diagram illustrating one embodiment of a management module of the present invention.

FIG. 4 is a schematic block diagram illustrating one embodiment of a management module 400 of the present invention. The processor module 205, memory module 210, and interface module 215 share a digital electrical bus 405. The bus 405 includes a plurality of data signals, a plurality of address signals, and one or more control signals. The processor module 205, memory module 210, and interface module 215 each include one or more registers, memory locations, or communication ports, each with a unique binary address.

The processor module 205 may move data from a target register, memory location or communication port by asserting the binary address signals of the target on one or more address signal comprising an address bus, and asserting a read control signal, causing the target to drive the data signals of the bus 405 with the binary value of the target. The processor module 205 may retrieve the target data by writing the binary values from the data signals of the bus 405 to a register, memory location, or communication port such as an internal register. In addition, the processor 205 may move data to a target register, memory location, or communication port by asserting the binary address signals of the target, asserting the binary value of the data on the data signals of the bus 405, and asserting a write control signal, causing the target to receive the binary value.

The processor module 205 may execute one or more software programs comprising a maintenance operation. In one embodiment, the processor module 205 executes the maintenance operation by communicating commands and data through the interface module 215 and the interconnection module 110 to the storage device 115. The processor module 205 may address a data group comprising commands and data to the interface module 215. The data group may include an address comprising the address of the storage device 115 and an internal address of a register, memory location, or communication port within the storage device 115. The storage device 115 may also communicate data and status information through the interconnection module 110 in a data group comprising the address of the interface module and a bus 405 address.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
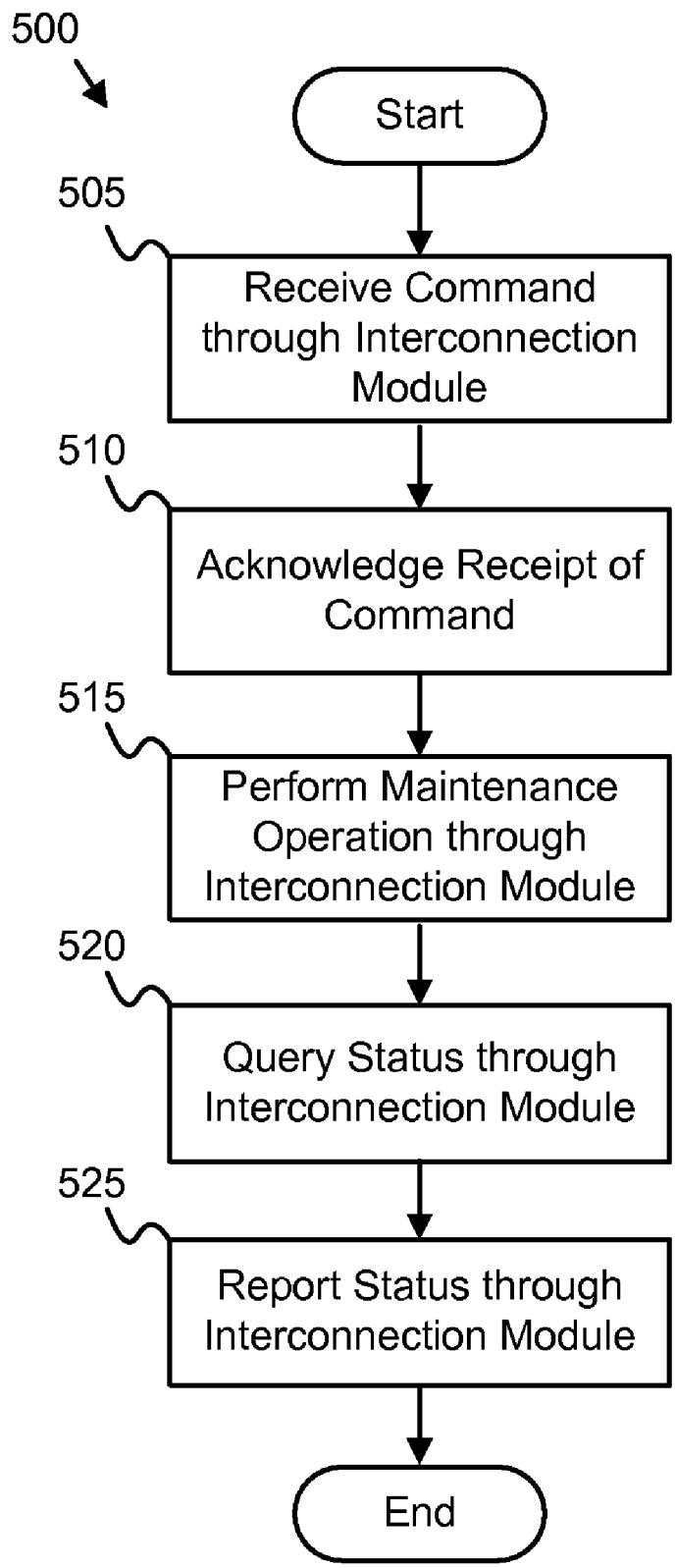
FIG. 5 is a schematic flow chart diagram illustrating one embodiment of a maintenance method in accordance with the present invention.

FIG. 5 is a schematic flow chart diagram illustrating one embodiment of a maintenance method 500 in accordance with the present invention. Under the method 500, a management module 105 receives 505 a command through an interconnection module 110. The interconnection module 110 is configured as a non-blocking switch. In one embodiment, the command comprises a maintenance command identifier. For example, the maintenance command identifier may comprise the file name of an executable file configured to initiate execution of the maintenance operation.

The command may further comprise one or more parameters. The parameters may modify the execution of the maintenance operation. For example, a first and second parameter may specify an address range of a storage device 115. In an alternate example, a third parameter may specify the time the maintenance operation is to be initiated. In one embodiment, the management module 105 acknowledges 510 receipt of the command. For example, if an adapter module 125 communicates the command to the management module 105, the management module 105 may acknowledge 510 of receipt of the command to the adapter module 125.

The management module 105 performs 515 the maintenance operation on the storage device 115 by communicating with the storage device 115 through the interconnection module 110. In one embodiment, the management module 105 performs 515 a format maintenance operation. The format maintenance operation may comprise writing sector and metadata information to the storage device 115 and organizing the storage device 115 to support a file system. In another embodiment, the management module 105 performs 515 a surface initialization maintenance operation on the storage device 115. The surface initialization maintenance operation may comprise writing a specified data pattern such as a pattern of binary zeros to the storage device 115.

The management module 105 may also perform 515 a certification maintenance operation on the storage device 115. In one embodiment, the certification operation comprises calculating a redundant data value such as a checksum for a portion of storage device 115 data and comparing the calculated redundant data value with a stored redundant data value that was calculated previously and stored to the storage device 115. The storage device 115 data may be certified if the calculated redundant data value is equivalent to the stored redundant data value.

In one embodiment, the management module 105 performs 515 a health check maintenance operation on the storage device 115. The health check maintenance operation may comprise one or more operations configured to estimate the likelihood of a storage device 115 failure.

In one embodiment, the adapter module 125 queries 520 the management module 105 on the status of the maintenance operation. For example, the adapter module 125 may query 520 for the amount of the storage device 115 that has been formatted by the management module 105.

In one embodiment, the management module 105 reports 525 the status of the maintenance operation to the adapter module 125. The management module 105 may report 525 the status in response to an adapter module 125 query 520. Alternatively, the management module 105 may report 525 the status at specified intervals. For example, the management module 105 may report the status every five hundred milliseconds (500 ms). In addition, the management module 105 may report 525 the status of the maintenance operation upon completion of the maintenance operation. For example, the maintenance module 105 may report 525 the completion of a surface initialization maintenance operation to the adapter module 125.

The method 500 localizes the performance 515 of maintenance operations with minimal impact to other operations as the management module 105 performs 515 the maintenance operation through the interconnection module 110 configured as a non-blocking switch. The resources of modules such as the adapter module 125 or the communication channel 130 are only occasionally required, increasing the performance of the overall system.

Figure 6:
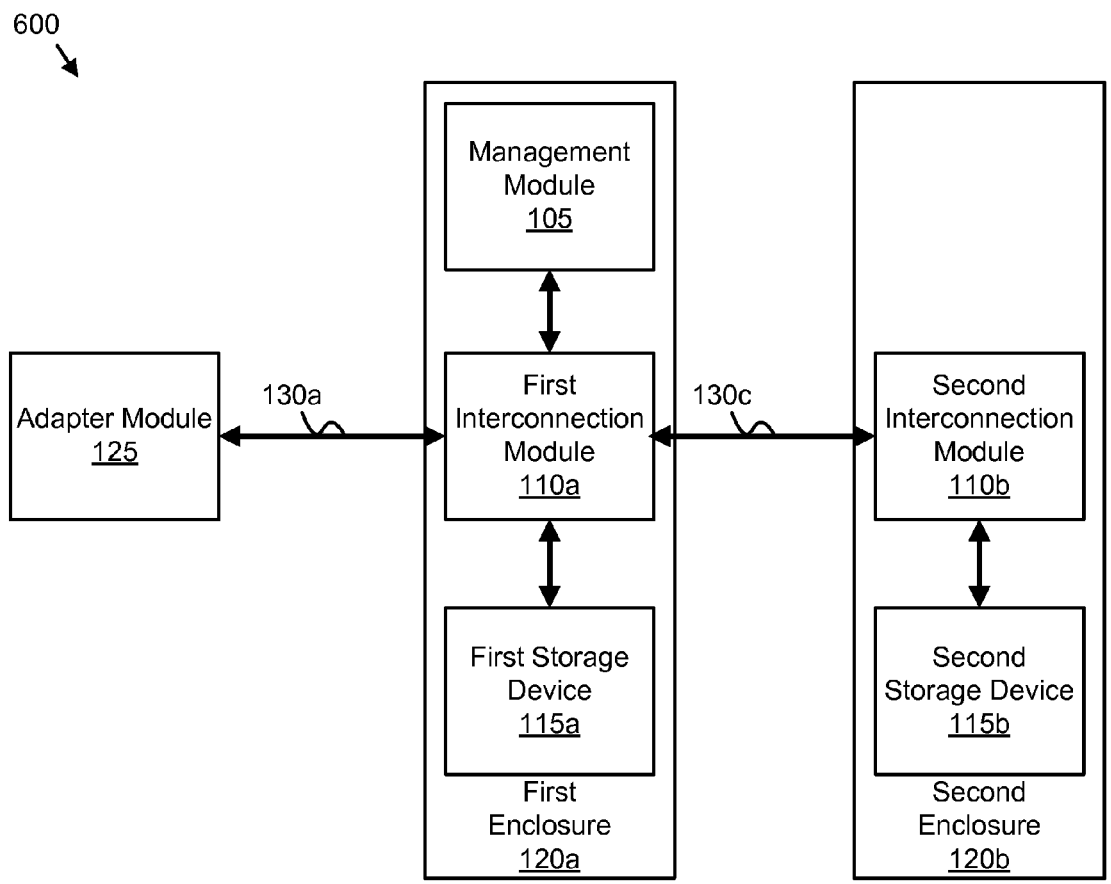
FIG. 6 is a schematic flow chart diagram illustrating one embodiment of an alternate maintenance system of the present invention.

FIG. 6 is a schematic flow chart diagram illustrating one embodiment of an alternate maintenance system 600 of the present invention. As depicted the system 600 comprises a plurality of enclosures 120. A first enclosure 120a comprises a management module 105 and a second enclosure 120b does not comprise a management module 105. Although the depicted system 600 includes one first enclosure 120a with a management module 105 and one second enclosure without a management module 105, the system may comprise any number of enclosures 120 with management modules 105 and any number of enclosures 120 without management modules 105.

The adapter module 125 communicates a command to the management module 105 directing the management module 105 to perform 515 a maintenance operation. The command may specify that the management module 105 perform 515 the maintenance operation on the first storage device 115a, the second storage device 115b, or both the first storage device 115a and the second storage device 115b.

For example, the adapter module 125 may communicate a command directing the management module 105 to perform 515 a health check maintenance operation on the second storage device 115b. The management module 105 performs 515 the health check maintenance operation on the second storage device 115b through the first interconnection module 110a and the second interconnection module 110b. The system 600 locally performs maintenance operations while reducing the processing demands on the adapter module 125.

The present invention is the first to perform a maintenance operation locally through a non-blocking interconnection module 110 on a storage device in response to a command received through the interconnection module 110. In addition, the present invention may free communications bandwidth through the interconnection module 110 and through a communication channel 130, as well as the processing bandwidth of an adapter module 125 in communication with the interconnection module 110. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for maintaining a storage device, the apparatus comprising:
   a first interconnection module comprising very large scale integration circuits, the first communication module in communication with a storage device and an adapter module and configured as non-blocking switch;
   a memory module comprising very large scale integration circuits and storing executable code;
   a processor module comprising very large scale integration circuits and executing the executable code, the executable code comprising
      a management module in communication with the first interconnection module and performing a maintenance operation on a first storage device through the first interconnection module in response to a command communicated from the adapter module through the first interconnection module, the maintenance operation comprising a surface initialization operation that writes a pattern of binary zeros to each storage device, the first interconnection module, the management module, and the first storage device contained by a first enclosure;
   the first interconnection module in communication with a second interconnection module of a second enclosure, the second interconnection module comprising very large scale integration circuits; and
   the management module further performing the maintenance operation on a second storage device of the second enclosure through the second interconnection module.

2. The apparatus of claim 1, the management module further reporting the status of the maintenance operation through the first interconnection module to the adapter module.

3. The apparatus of claim 1, wherein the adapter module is in communication with the second interconnection module through the first interconnection module.

4. The apparatus of claim 1, wherein the first interconnection module is a non-blocking Fibre Channel Arbitrated Loop switch.

5. The apparatus of claim 1, the management module performing a health check maintenance operation.

6. The apparatus of claim 1, wherein the management module comprises:
   an interface module comprising very large scale integration circuits and in communication with the first interconnection module;
   the processor module in communication with the interface module; and
   the memory module in communication with the interface module and the processor module.

7. An apparatus for maintaining a storage device, the apparatus comprising:
   a plurality of interconnection modules each comprising very large scale integration circuits, each in communication with at least one other interconnection module, and each are non-blocking switches in communication with a storage device, each interconnection module and each storage device contained in an enclosure; and
   a memory module comprising very large scale integration circuits and storing executable code;
   a processor module comprising very large scale integration circuits and executing the executable code, the executable code comprising a management module contained in a first enclosure, in communication with a first interconnection module of the first enclosure, and performing a maintenance operation on the storage devices through the plurality of interconnection modules, the maintenance operation comprising a surface initialization operation that writes a pattern of binary zeros to each storage device.

8. A system for maintaining a storage device, the system comprising:
 an adapter module comprising very large scale integration circuits and controlling a plurality of enclosures;
 a first enclosure comprising:
  a first storage device storing and retrieving data;
  a first interconnection module comprising very large scale integration circuits, the first interconnection module in communication with the storage device and the adapter module and that is a non-blocking switch;
 a memory module comprising very large scale integration circuits and storing executable code;
 a processor module comprising very large scale integration circuits and executing the executable code, the executable code comprising
  a management module in communication with the first interconnection module and performing a maintenance operation on the first storage device through the first interconnection module in response to a command communicated from the adapter module through the first interconnection module, the maintenance operation comprising a surface initialization operation that writes a pattern of binary zeros to each storage device;
 a second enclosure comprising
  a second storage device;
  a second interconnection module comprising very large scale integration circuits and in communication with the first interconnection module; and
 the management module further performing the maintenance operation on the second storage device through the second interconnection module.

9. The system of claim 8, the management module further reporting the status of the maintenance operation through the first interconnection module to the adapter module.

10. The system of claim 8, wherein the adapter module is in communication with the second interconnection module through the first interconnection module.

11. The system of claim 10, wherein the adapter module is in parallel communication with the first interconnection module of the first enclosure and the second interconnection module of the second enclosure.

12. The system of claim 8, wherein the first interconnection module is a non-blocking Fibre Channel Arbitrated Loop switch.

13. The system of claim 8, the management module performing a certification maintenance operation.

14. The system of claim 8, the management module performing a formatting maintenance operation.

15. The system of claim 8, wherein the management module comprises:
 an interface module comprising very large scale integration circuits and in communication with the first interconnection module;
 the processor module in communication with the interface module; and
 the memory module in communication with the interface module and the processor module.

16. The system of claim 8, further comprising a computer network in communication with the adapter module.

17. A memory module comprising very large scale integration circuits storing a program of executable code executed by a processor module comprising very large scale integration circuits, wherein the program performs operations for maintaining a storage device, the operations comprising:
 receiving a command through a first interconnection module that is a non-blocking switch;
 performing a maintenance operation from a first enclosure on a first storage device of the first enclosure through the interconnection module in response to the command, the maintenance operation comprising a surface initialization operation that writes a pattern of binary zeros to the first storage device, the first storage device contained by a first enclosure; and
 performing the maintenance operation from the first enclosure on a second storage device of a second enclosure through a second interconnection module.

18. The memory module of claim 17, wherein the program further performs operations from the first enclosure to query the status of the maintenance operation through the interconnection module.

19. The memory module of claim 17, wherein the program further reports the status of the maintenance operation through the interconnection module from the first enclosure.

20. The memory module of claim 17, wherein the program further performs a formatting maintenance operation from the first enclosure.

21. The memory module of claim 17, wherein the program further performs a health check maintenance operation from the first enclosure.

22. The memory module of claim 17, wherein the program further performs a certification maintenance operation from the first enclosure.

23. The memory module of claim 17, wherein the program further controls the interconnection module as a non-blocking Fibre Channel Arbitrated Loop switch.

24. An apparatus to maintaining a storage device, the apparatus comprising:
 first means for receiving a command through an interconnection module that is a non-blocking switch, the first receiving means comprising very large scale integration circuits; and
 a memory module comprising very large scale integration circuits and storing executable code;
 a processor module comprising very large scale integration circuits and executing the executable code, the executable code comprising means for performing a maintenance operation on a storage device through the first receiving means in response to the command, the maintenance operation comprising a surface initialization operation that writes a pattern of binary zeros to each storage device, the first receiving means, the performing means, and the first storage device contained by a first enclosure;
 second receiving means of a second enclosure in communication with the first receiving means, the second receiving means comprising very large scale integration circuits; and
 the performing means further performing the maintenance operation on a second storage device of the second enclosure through the second receiving means.

* * * * *